UNITED STATES PATENT OFFICE.

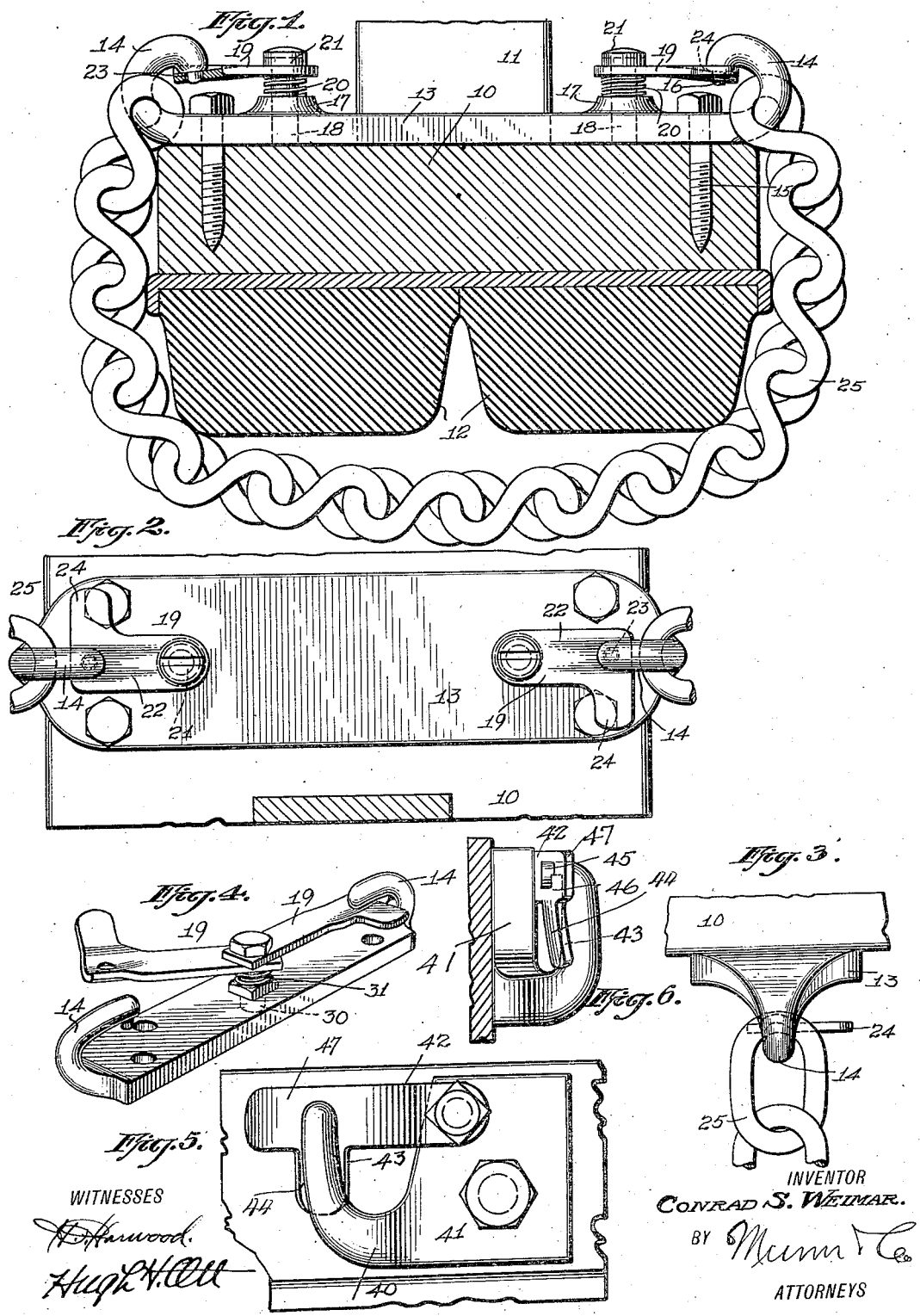

CONRAD S. WEIMAR, OF ELIZABETH, NEW JERSEY.

ANTISKID CHAIN ANCHOR.

1,414,846.  Specification of Letters Patent.  Patented May 2, 1922.

Application filed February 23, 1921. Serial No. 447,043.

*To all whom it may concern:*

Be it known that I, CONRAD S. WEIMAR, a citizen of the United States, and a resident of Elizabeth, in the county of Union and State of New Jersey, have invented a new and Improved Antiskid Chain Anchor, of which the following is a full, clear, and exact description.

This invention relates to anti-skid devices and refers more particularly to a retaining hook for anti-skid chains especially designed for use in connection with motor trucks.

It has become the general practice to employ short lengths of chains to prevent the skidding of motor trucks and to provide an additional traction device by hooking the opposite extremities of the chain to opposite sides of the felly. Many objectionable features have been noted due to the fact that the links become worn to such an extent as to increase the length of the chain sections thus allowing sufficient slack in the chain to permit of its disengagement from the hooks during the travel of the vehicle.

It is therefore one of the principal objects of the present invention to construct a simple and effective retaining hook which positively prevents the accidental displacement of the chain under such circumstances.

Another object of the invention resides in the provision of a retaining hook of the character described which admits of the ready application or removal of the chain from the wheel.

A further object of the invention resides in the provision of a hook of the character described which is extremely simple in its construction, inexpensive to produce, and which is of a strong and durable nature and highly efficient in its purpose.

With the above recited and other objects in view, some of which will appear hereafter, reference is had to the accompanying drawings in which;

Figure 1 is a transverse sectional view through the felly of a wheel illustrating a preferred form of retaining hook applied thereto.

Figure 2 is a fragmentary plan view of the hook in its applied position.

Figure 3 is a side view thereof.

Figure 4 is a detail perspective view of another embodiment of the invention.

Figure 5 is a side elevation of a further embodiment of the invention.

Figure 6 is an end view thereof.

Referring to the drawings by characters of reference, 10 designates the felly of a wheel, 11 the spokes and 12 the usual tread or tire. In the preferred embodiment of the invention, the retaining means consists of an elongated base 13 provided at its opposite extremites with the receiving and retaining hooks 14 of identical construction, the same being preferably formed as an integral part of the base 13. In practice the base is secured by suitable screw bolts or other fastening devices 15 to the inner periphery of the felly transversely thereof, with hooked extremities 14 disposed at opposite sides thereof. Each hook is provided with a reduced lug 16 projecting from its nose for a purpose to be hereafter set forth. As illustrated the base is provided with apertured bosses 17 adjacent the nose of the hook into which is threaded a pivot pin or bolt 18. A retaining arm 19 is mounted on the pivot bolt 18 and a coiled spring 20 is interposed between the boss and said arm for normally exerting a force to advance and retain the same in contact with the head 21 of the pivot bolt 18. The outer free extremity of the retaining arm is dished or concaved as at 22 and provided with an aperture 23, the dished or concave portion being designed to embrace the nose of the hook 14 and the aperture adapted to receive the lug 16 projecting therefrom. The spring 20 operates to retain the concave portion 22 over the nose of the hook and the aperture over the lug 16. The free extremity of the arm is further provided with a transversely projecting extension 24 which functions to engage and co-act with one of the links of the anti-skid chain 25, to prevent the shifting of the same onto the retaining arm 19 thereby effectually preventing any chance of the chain exerting a pull to disengage the retaining arm. To remove or apply the chain to the wheel, it is only necessary to depress and swing the arm 19 to expose the nose of the hook. As the chain becomes worn, one or more of the links may be removed to insure a proper fit of the same. In the modified form illustrated in Figure 4 of the drawings, a single pivot bolt 30 is employed for mounting the retaining arms 19 of each of the hooks 14 and a single spring 31 is sufficient to insure the proper functioning of the same. The use and operation of the device is identical with that of the preferred form. This arrangement is especially adapted for pleasure cars or other vehicles having fellies of narrow widths.

In the modified form illustrated in Figures 5 and 6 of the drawings, the hooks 40 are each mounted on an independent base 41 designed to be applied to the side of the felly where it is impossible to arrange the device on the inner periphery of the felly. In this form the free extremity of the retaining arm 42 is provided with a transversely projecting extension 43 which is curved as at 44 to embrace the nose of the hook and the same is apertured as at 45 to receive the lug 46 projecting from the nose. The free end 47 of the arm extends beyond the projection 43 and constitutes a stop to co-act and engage with the link of the chain to prevent of the shifting of the same onto the retaining arm.

While there has been illustrated and described several forms in which the device may be constructed, no limitation is made to the precise structural details, as it is to be understood that variations and modifications properly falling within the scope of the appended claims may be resorted to when found expedient.

I claim:

1. An anti-skid chain anchor, including a plate adapted to be attached to a wheel felly, a hook integral with one end of the plate providing a point of attachment for an end link of an anti-skid chain, a pivoted spring held arm associated with the plate and having a perforation in its free end, and a reduced extremity at the nose of the hook engageable in the perforation.

2. An anti-skid chain anchor, comprising a plate adapted to be attached to a wheel felly, hooks integral with the ends of the plate and adapted to receive the end links of a tire embracing chain, a pair of independently movable spring held arms, said arms pivoted upon a common center and having perforations in their free ends, the noses of said hooks terminating in reduced extremities engageable in perforations, and laterally projecting extensions integral with the free ends of the arms preventing the end links of the chain from entering upon the arms.

CONRAD S. WEIMAR.